US005884752A

United States Patent [19]

Osborn et al.

[11] Patent Number: 5,884,752

[45] Date of Patent: Mar. 23, 1999

[54] ELEVATOR SYSTEM

[75] Inventors: Simon Osborn, Ramsgate; Gordan Crompton, Broadstairs, both of England

[73] Assignee: Cromptons Leisure Machines Limited, Kent, England

[21] Appl. No.: 875,291

[22] PCT Filed: Jan. 24, 1996

[86] PCT No.: PCT/GB96/00146

§ 371 Date: Jul. 23, 1997

§ 102(e) Date: Jul. 23, 1997

[87] PCT Pub. No.: WO96/22938

PCT Pub. Date: Aug. 1, 1996

[30] Foreign Application Priority Data

Jan. 24, 1995 [GB] United Kingdom .................... 9501340

[51] Int. Cl.[6] ...................................................... B65G 47/40

[52] U.S. Cl. ............................................ 198/706; 198/712

[58] Field of Search .................................... 198/706, 701, 198/703, 710, 712; 221/192; 273/148 R

[56] References Cited

U.S. PATENT DOCUMENTS

| | | | |
|---|---|---|---|
| 1,550,891 | 8/1925 | Eck | 198/701 |
| 2,280,941 | 4/1942 | Adams | 198/706 |
| 3,942,663 | 3/1976 | Wentzel . | |

FOREIGN PATENT DOCUMENTS

| | | | |
|---|---|---|---|
| 2 483 385 | 12/1981 | France . | |
| 27 23 340 | 12/1978 | Germany . | |
| 40 41 077 | 6/1992 | Germany . | |
| 0093788 | 1/1990 | Japan | 221/192 |
| 404295986A | 10/1992 | Japan | 221/192 |

*Primary Examiner*—James R. Bidwell
*Assistant Examiner*—Khoi H. Tran
*Attorney, Agent, or Firm*—McDermott, Will & Emery

[57] ABSTRACT

The invention relates to apparatus for conveying material between a lower station and an upper station. The apparatus includes a bucket (16) for containing material to be conveyed, a guide channel (15) between the upper station and the lower station, a lower guide peg (14) attached to a lower part of the bucket (16) and arranged to slide along the guide channel (15), and an upper guide peg (17) attached to an upper part of the bucket (16) and arranged to slide along the guide channel (15). The bucket (16) is driven between the lower station and the upper station. A deflector guide (12) branches from the guide channel (15) so as to guide one of the guide pegs (17) away from the guide channel while the other guide peg (14) remains in the guide channel. The bucket (16) is thereby caused to pivot about the other guide peg (14) and thus tip out material contained therein.

6 Claims, 2 Drawing Sheets

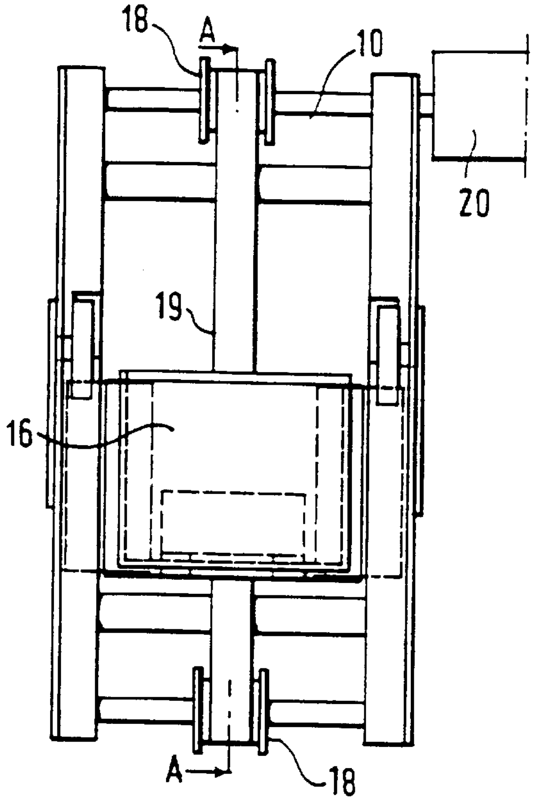
Fig.2.
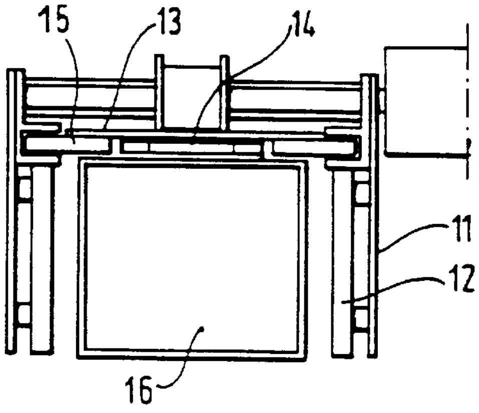
Fig.3.
Fig.4.
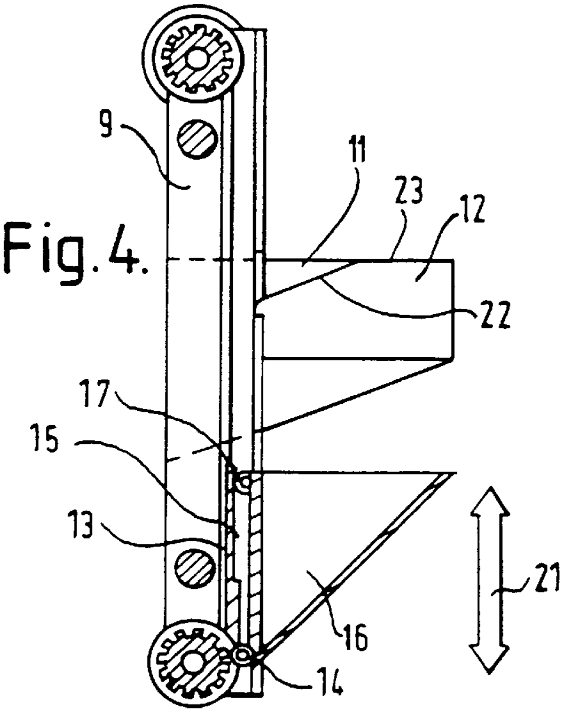
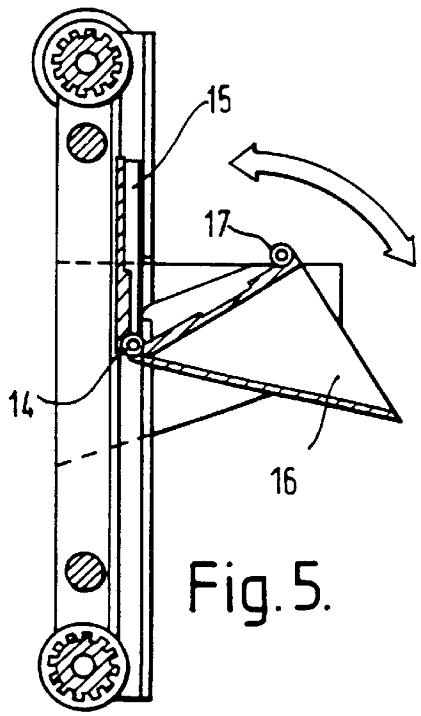
Fig.5.

ELEVATOR SYSTEM

This invention relates to an elevator system, and more particularly to apparatus for conveying material between a lower station and an upper station.

According to the invention, there is provided apparatus for conveying material between a lower station and an upper station, comprising a bucket for containing material to be conveyed; a guide channel between the upper station and the lower station; a lower guide peg attached to a lower part of the bucket and arranged to slide along the guide channel; an upper guide peg attached to an upper part of the bucket and arranged to slide along the guide channel; means for driving the bucket between the lower station and the upper station; and a deflector guide branching from the guide channel for guiding one of the guide pegs away from the guide channel while the other guide peg remains in the guide channel, thereby causing the bucket to pivot about the said other guide peg and tip out material contained therein.

The apparatus according to the invention is particularly, but not exclusively, suitable for incorporation in an amusement machine. The bucket may be used, for example, for conveying coins, coin-like tokens, balls or other small articles which are used in the amusement machine. In a typical case, coins are transported from a lower location in the machine to a hopper at an upper location.

In one embodiment, the bucket is used to convey material from a lower station to an upper station. The lower guide peg is adapted to remain in the guide channel and to act as a pivot or hinge for the bucket. The upper guide peg is in the form of a wheel to assist in movement along the deflector guide. The deflector guide itself extends upwardly and outwardly from the guide channel at a location between the lower station and the upper station. Thus, as the bucket is raised from the lower station, the upper guide wheel travels initially along the guide channel, and then away from the guide channel along the deflector guide, thus causing the bucket to pivot about the hinge. The process is then reversed to return the bucket to the lower station. The bucket is driven by engagement between the hinge and a moving belt which is arranged between the lower station and the upper station, and which can be driven either upwardly or downwardly.

Reference is now made to the accompanying drawings, in which:

FIG. 2 is a front elevation of an elevator system according to an embodiment of the invention;

FIG. 3 is a plan view of the elevator system of FIG. 2;

FIG. 4 is a diagrammatic section on line A—A of FIG. 2, showing the bucket in the lower position; and FIG. 5 corresponds to FIG. 4, but with the bucket in the upper position.

Figure 1:
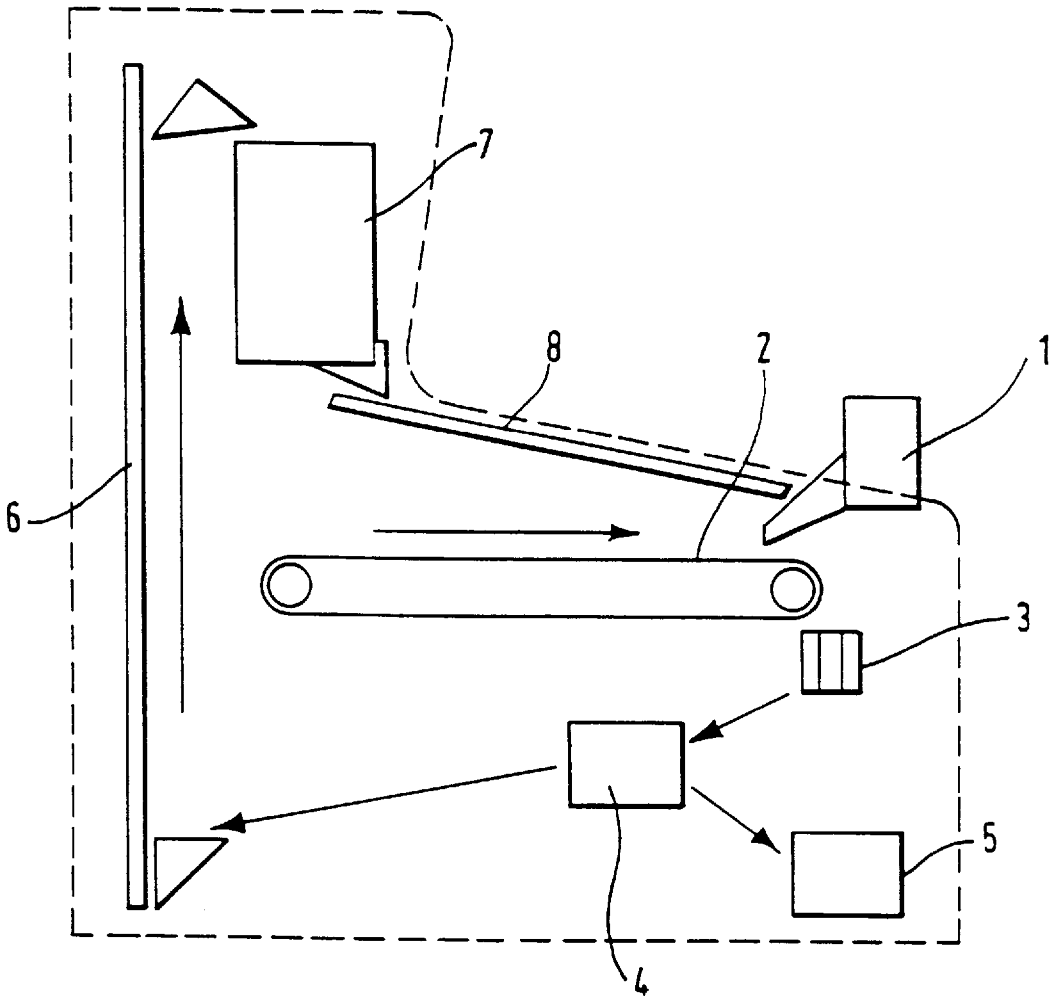
FIG. 1 is a diagrammatic representation of an amusement machine incorporating an elevator system according to an embodiment of the invention.

FIG. 1 illustrates an amusement machine of the type in which the player projects coins onto a moving belt. Depending on where the coins land on the belt, the player may win a prize, which may consist of a payout of coins from the machine. A coin entry aiming system 1 is provided, by means of which the player projects coins onto a conveyor belt 2, the upper surface of which travels continuously towards the player. Coins fall off the front end of the belt and are received by a coin detection system 3, from which they pass to a diverter unit 4. The diverter unit 4 will pass coins either to a cash box 5 or to a payout hopper 7. Coins are only passed to the cash box when the payout hopper is full. The coin detection system, diverter unit and cash box are situated in the lower part of the machine, but the payout hopper is in the upper part of the machine. An elevator system 6 is therefore provided for receiving coins from the diverter unit 4 and transporting them upwardly to the payout hopper 7. When the player wins a prize, coins are released from the payout hopper 7 and pass along a downwardly sloping payout surface 8, from which they can be retrieved by the player.

The elevator system is shown in more detail in FIGS. 2 to 5. The apparatus shown is for conveying coins from a lower station to an upper station. The coins are conveyed inside a bucket 16 which is of triangular shape, viewed from the side, with a vertex at the lower end. A pair of vertical guide channels 15 is arranged between the lower station and the upper station, one on each side of the bucket. These guide channels 15 are adjacent to channel slides 9 supported by channel supports 10. A lower guide peg in the form of a transverse hinge 14 is mounted transversely at the lower end of the bucket 16. The lateral ends of the hinge 14 engage in the guide channel 15 at each side of the bucket, and are able to slide up and down in the guide channel. An upper guide peg is in the form of a wheel 17 mounted at the top end of the bucket 16, vertically above the hinge 14 when the bucket is at the lower station (see FIG. 4), and projecting transversely from each side of the bucket. The wheels 17 engage respectively in the guide channel 15 on each side of the bucket and are in rolling engagement with the guide channel.

A continuous belt 19 is disposed between upper and lower pulleys 18 respectively at the upper and lower stations. Preferably the belt is toothed on its inner surface for engagement with corresponding teeth on the pulleys. The upper pulley is driven by an electric motor 20, which can cause the pulley to rotate in either direction. The hinge 14 attached to the lower end of the bucket 16 is in turn attached to a plate which is fixed to the belt 19. Thus, the belt can be driven in either direction, so as to raise or lower the bucket 16, as indicated by the arrows 21.

At a point between the upper and lower stations, a deflector guide in the form of a guide ramp 12 is provided adjacent the guide channel 15. The guide ramp 12 is supported by a ramp support 11. A cut-out in front of the channel section bordering the guide channel 15 is provided next to the guide ramp 12. The upper surface of the guide ramp 12 includes a first upwardly sloping part 22 and a second substantially horizontal part 23, which provide a branch away from the guide channel 15.

When it is in the lower position, as shown in FIG. 4, the bucket 16 is locked in the upright position, with both the guide wheel 17 and the hinge 14 engaged in the guide channel 15. In this position, the bucket 16 is able to receive a supply of coins, and thereafter convey the coins to the upper station. The bucket 16 is raised by movement of the belt 19 driven by the motor 20. Initially, the bucket remains in the upright position, with both the guide wheel 17 and hinge 14 engaged in the guide channel 15. When the guide wheel 17 reaches the cut-outs in front of the channel section, the guide wheel 17 is diverted along the upwardly sloping surface 22 of the guide ramp 12. Further upward movement of the bucket causes the guide wheel 17 to move further along the guide ramp 12 until it is on the horizontal surface 23. During movement of the guide wheel 17 along the guide ramp 12, the bucket is caused to pivot about the hinge 14, until it reaches the point shown in FIG. 5 where the contents of the bucket are tipped out. The direction of movement of the belt 19 is then reversed, and the bucket is returned to the lower station. Reversal of the direction of movement of the belt 19, when the bucket 16 is at the uppermost position, is effected by engagement of the bucket with a micro switch at the upper end of the guide channel 15. The micro switch communicates with a control board which causes the motor 20 to reverse. The bucket 16 is thus returned to the lower station, where it engages another micro switch at the lower end of the channel 15. This micro switch also communicates with the control board and causes the motor to stop.

The motor 20 is started again, to repeat the process, under the control of a processor board which counts the coins inserted into the machine at the coin entry 1. The control board also receives a signal from the hopper 7 when the hopper is fall. In this situation, operation of the bucket does not take place, and coins are diverted to the cash box 5.

In a modification of the machine, the conveyor belt 2 can travel away from the player. In that case, the coin detection system 3 and the diverter unit 4 are repositioned as appropriate as the coins will fall from the end of the conveyor belt 2 remote from the player.

In a further modification, the coin detection system 3 and diverter unit 4 can be substituted by a by-directional conveyor belt positioned below the conveyor belt 2 so as to collect coins which fall off the end of the belt 2. Depending on the direction of travel of the by-directional belt, which is controlled by a processor board, the coins can be conveyed by the by-directional belt either to the bucket 16 at its lower most position or to the cash box 5.

We claim:

1. Apparatus for conveying material between a lower station and an upper station, comprising a bucket for containing material to be conveyed; a guide channel between the upper station and the lower station; a lower guide peg attached to a lower part of the bucket and arranged to slide along the guide channel; an upper guide peg attached to an upper part of the bucket and arranged to slide along the guide channel; means for driving the bucket between the lower station and the upper station; and a deflector guide branching from the guide channel for guiding one of the guide pegs away from the guide channel while the other guide peg remains in the guide channel, thereby causing the bucket to pivot about the said other guide peg and tip out material contained therein.

2. Apparatus according to claim 1, in which the bucket is adapted to convey material from a lower station to an upper station, and the lower guide peg is adapted to remain in the guide channel and to act as a pivot or hinge for the bucket.

3. Apparatus according to claim 2, in which the upper guide peg is in the form of a wheel to assist in movement along the deflector guide.

4. Apparatus according to claim 3, in which the deflector guide extends upwardly and outwardly from the guide channel at a location between the lower station and the upper station.

5. Apparatus according to claim 1, in which the bucket is drivable by engagement between the lower guide peg and a moving belt which is arranged between the lower station and the upper station, and which can be driven either upwardly or downwardly.

6. Apparatus according to claim 1, which is incorporated in an amusement machine and arranged for transporting small articles from a lower station in the machine to a hopper at an upper station.

* * * * *